(12) United States Patent
Lundquist et al.

(10) Patent No.: US 11,654,365 B2
(45) Date of Patent: *May 23, 2023

(54) SECURE ANTI-CHEAT SYSTEM

(71) Applicant: Electronic Arts Inc., Redwood City, CA (US)

(72) Inventors: Robert Bo Lundquist, Vallentuna (SE); Niklas Per Sandén, Stockholm (SE)

(73) Assignee: Electronic Arts Inc., Redwood City, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/347,346

(22) Filed: Jun. 14, 2021

(65) Prior Publication Data
US 2022/0001283 A1 Jan. 6, 2022

Related U.S. Application Data

(63) Continuation of application No. 16/575,165, filed on Sep. 18, 2019, now Pat. No. 11,040,285, which is a
(Continued)

(51) Int. Cl.
*A63F 13/71* (2014.01)
*A63F 13/35* (2014.01)
*A63F 13/5375* (2014.01)

(52) U.S. Cl.
CPC .............. *A63F 13/71* (2014.09); *A63F 13/35* (2014.09); *A63F 13/5375* (2014.09)

(58) Field of Classification Search
CPC .......... G06F 21/57; G06F 21/56; G06F 21/55; G06F 21/51; G06F 21/50; A63F 13/71; A63F 13/5375; A63F 13/35
See application file for complete search history.

(56) References Cited

U.S. PATENT DOCUMENTS 2,063,100 A    12/1936    Johnsen
6,769,016 B2    7/2004    Rothwell et al.
(Continued)

FOREIGN PATENT DOCUMENTS

JP    2003-126555 A    5/2003
JP    2009-187143 A    8/2009
(Continued)

OTHER PUBLICATIONS

Alex Beutel, Wanhong Xu, Venkatesan Guruswami, Christopher Palow, and Christos Faloutsos. "Copycatch: stopping group attacks by spotting lockstep behavior in social networks." In WWW, pp. 119-130. ACM, 2013.
(Continued)

*Primary Examiner* — Thomas H Henry
(74) *Attorney, Agent, or Firm* — Knobbe, Martens, Olson & Bear, LLP

(57) ABSTRACT

An anti-cheat system may be accessed over a network and stored directly into volatile memory of a user computing system. In some embodiments, this anti-cheat system may scan, or access portions of, the volatile memory of the user computing system to detect whether cheat software or other unauthorized software that may interact with a game application is detected on the user computing system. The accessed portions of the volatile memory may be compared with one or more signatures that are associated with the execution of cheat software on a computing system. The anti-cheat system may be prevented from being stored within non-volatile memory, thereby preventing malicious users from modifying the anti-cheat system.

20 Claims, 5 Drawing Sheets

Related U.S. Application Data continuation of application No. 14/752,467, filed on Jun. 26, 2015, now Pat. No. 10,427,048.

(60) Provisional application No. 62/139,210, filed on Mar. 27, 2015.

(56) References Cited

U.S. PATENT DOCUMENTS

| | | |
|---|---|---|
| 7,721,336 B1 | 5/2010 | Adjaoute |
| 7,877,482 B1 | 1/2011 | Ashcraft et al. |
| 7,974,849 B1 | 7/2011 | Begole et al. |
| 8,370,389 B1 | 2/2013 | Dotan |
| 8,589,174 B2 | 11/2013 | Nelson et al. |
| 8,635,117 B1 | 1/2014 | Acuña-Rohter |
| 8,661,547 B1 | 2/2014 | Kononov et al. |
| 8,726,379 B1 | 5/2014 | Stiansen et al. |
| 8,794,508 B1 | 8/2014 | Pascal |
| 8,881,266 B2 | 11/2014 | Chow et al. |
| 9,112,895 B1 | 8/2015 | Lin |
| 9,231,936 B1 | 1/2016 | Wang et al. |
| 9,517,402 B1 | 12/2016 | Vogel |
| 9,529,777 B2 | 12/2016 | Tjew et al. |
| 9,785,988 B2 | 10/2017 | Petri et al. |
| 9,942,250 B2 | 4/2018 | Stiansen et al. |
| 9,992,018 B1 | 6/2018 | Tjew et al. |
| 10,069,852 B2 | 9/2018 | Turgeman et al. |
| 10,193,772 B1 | 1/2019 | Tjew et al. |
| 10,204,374 B1 | 2/2019 | Holan et al. |
| 10,242,032 B2 | 3/2019 | Sundaresan et al. |
| 10,427,048 B1 | 10/2019 | Lundquist et al. |
| 10,459,827 B1 | 10/2019 | Aghdaie et al. |
| 10,460,320 B1 | 10/2019 | Cao et al. |
| 10,997,599 B2 | 5/2021 | Adjaoute |
| 11,040,285 B1 | 6/2021 | Lundquist et al. |
| 11,179,639 B1 | 11/2021 | Aghdaie et al. |
| 2002/0133721 A1 | 9/2002 | Adjaoute |
| 2002/0165838 A1 | 11/2002 | Vetter |
| 2004/0039630 A1 | 2/2004 | Begole et al. |
| 2005/0014559 A1 | 1/2005 | Mattice et al. |
| 2005/0091524 A1 | 4/2005 | Abe et al. |
| 2005/0108384 A1 | 5/2005 | Lambert et al. |
| 2006/0036727 A1 | 2/2006 | Kurapati et al. |
| 2006/0093142 A1 | 5/2006 | Schneier et al. |
| 2007/0043851 A1 | 2/2007 | Yellamraju et al. |
| 2007/0111794 A1 | 5/2007 | Hogan et al. |
| 2007/0121596 A1 | 5/2007 | Kurapati et al. |
| 2007/0266394 A1 | 11/2007 | Odent et al. |
| 2008/0059474 A1 | 3/2008 | Lim |
| 2008/0065994 A1 | 3/2008 | Wang et al. |
| 2008/0147354 A1 | 6/2008 | Rowan et al. |
| 2008/0207327 A1 | 8/2008 | Van Luchene et al. |
| 2008/0209544 A1 | 8/2008 | Kempka |
| 2008/0310312 A1 | 12/2008 | Acharya et al. |
| 2009/0054123 A1 | 2/2009 | Mityagin et al. |
| 2009/0143144 A1 | 6/2009 | Schluessler et al. |
| 2009/0164788 A1 | 6/2009 | Cho et al. |
| 2009/0219895 A1 | 9/2009 | Wu |
| 2009/0235226 A1 | 9/2009 | Murthy et al. |
| 2009/0300589 A1 | 12/2009 | Watters et al. |
| 2010/0094768 A1 | 4/2010 | Miltonberger |
| 2010/0162405 A1 | 6/2010 | Cook et al. |
| 2010/0227675 A1 | 9/2010 | Luxton et al. |
| 2011/0012603 A1 | 1/2011 | Bose et al. |
| 2011/0145137 A1 | 6/2011 | Driemeyer et al. |
| 2011/0167269 A1 | 7/2011 | Baykal et al. |
| 2012/0036250 A1 | 2/2012 | Vaswani et al. |
| 2012/0047578 A1 | 2/2012 | Lee et al. |
| 2012/0093370 A1 | 4/2012 | Ding et al. |
| 2012/0130853 A1 | 5/2012 | Petri et al. |
| 2012/0130856 A1 | 5/2012 | Petri et al. |
| 2012/0137367 A1 | 5/2012 | Dupont et al. |
| 2013/0072306 A1 | 3/2013 | Parnprome |
| 2013/0111019 A1 | 5/2013 | Tjew et al. |
| 2013/0296039 A1 | 11/2013 | Engineer et al. |
| 2013/0311977 A1 | 11/2013 | Nieminen et al. |
| 2014/0304054 A1 | 10/2014 | Orun et al. |
| 2015/0106927 A1 | 4/2015 | Ferragut et al. |
| 2015/0142595 A1 | 5/2015 | Acuña-Rohter |
| 2015/0238866 A1 | 8/2015 | Khabazian |
| 2015/0317749 A1 | 11/2015 | Soviany |
| 2015/0341379 A1 | 11/2015 | Lefebvre et al. |
| 2016/0110528 A1 | 4/2016 | Gupta et al. |
| 2016/0142435 A1 | 5/2016 | Bernstein et al. |
| 2016/0191654 A1 | 6/2016 | Healey et al. |
| 2016/0217022 A1 | 7/2016 | Velipasaoglu et al. |
| 2016/0342963 A1 | 11/2016 | Zoldi et al. |
| 2016/0359870 A1 | 12/2016 | Gu et al. |
| 2017/0060656 A1 | 3/2017 | Bhattacharya et al. |
| 2017/0076217 A1 | 3/2017 | Krumm et al. |
| 2017/0098067 A1 | 4/2017 | Paluri et al. |
| 2017/0111378 A1 | 4/2017 | Caffrey |
| 2017/0134415 A1 | 5/2017 | Muddu et al. |
| 2017/0223036 A1 | 8/2017 | Muddu et al. |
| 2019/0213498 A1 | 7/2019 | Adjaoute |
| 2022/0176254 A1 | 6/2022 | Aghdaie et al. |

FOREIGN PATENT DOCUMENTS

| | | |
|---|---|---|
| KR | 2002-0023903 A | 3/2002 |
| KR | 2006-0042363 A | 5/2006 |
| WO | WO 2004/025411 A2 | 3/2004 |

OTHER PUBLICATIONS

"Blizzard Entertainment Uses Spyware to Verify EULA Compliance", Schneier on Security, posted Oct. 13, 2005, retrieved Aug. 14, 2015, http://www.schneier.com/blog/archives/2005/10/blizzard_entert.html, 25 pgs.

Bokai Cao, Francine Chen, Dhiraj Joshi, and Philip S Yu. "Inferring crowd-sourced venues for tweets." IEEE Big Data, pp. 639-648. IEEE, 2015.

Bokai Cao, Xiangnan Kong, and Philip S Yu. "Collective prediction of multiple types of links in heterogeneous information networks." In ICDM, pp. 50-59. IEEE, 2014.

Qiang Cao, Michael Sirivianos, Xiaowei Yang, and Tiago Pregueiro. "Aiding the detection of fake accounts in large scale social online services." In NSDI, pp. 197-210, 2012.

Cao, Qiang, et al. "Aiding the Detection of Fake Accounts in Large Scale Social Online Services", http://www.usenix.org/system/files/conference/nsdi12/nsdi12-final42_2.pdf, accessed Aug. 6, 2015, 14 pgs.

William Eberle and Lawrence Holder. "Discovering structural anomalies in graph-based data." ICDMW, pp. 393-398. IEEE, 2007.

Jing Gao, Feng Liang, Wei Fan, Chi Wang, Yizhou Sun, and Jiawei Han. "On community outliers and their efficient detection in information networks." In KDD, pp. 813-822. ACM, 2010.

Saptarshi Ghosh, Bimal Viswanath, Farshad Kooti, Naveen Kumar Sharma, Gautam Korlam, Fabricio Benevenuto, Niloy Ganguly, and Krishna Phani Gummadi. "Understanding and combating link farming in the twitter social network." In WWW, pp. 61-70. ACM, 2012.

Manish Gupta, Jing Gao, Xifeng Yan, Hasan Cam, and Jiawei Han. "On detecting association-based clique outliers in heterogeneous information networks." In ASONAM, pp. 108-115. IEEE, 2013.

Manish Gupta, Arun Mallya, Subhro Roy, Jason HD Cho, and Jiawei Han. "Local learning for mining outlier subgraphs from network datasets." In SDM. SIAM, 2014.

Zoltán Gyöngyi, Hector Garcia-Molina, and Jan Pedersen. "Combating web spam with trustrank." In VLDB, pp. 576-587. VLDB Endowment, 2004.

Bryan Hooi, Hyun Ah Song, Alex Beutel, Neil Shah, Kijung Shin, and Christos Faloutsos. "Fraudar: Bounding graph fraud in the face of camouage." In KDD. ACM, 2016.

Ming Ji, Jiawei Han, and Marina Danilevsky. "Ranking-based classification of heterogeneous information networks." In KDD, pp. 1298-1306. ACM, 2011.

Meng Jiang, Peng Cui, Alex Beutel, Christos Faloutsos, and Shiqiang Yang. "Catchsync: catching synchronized behavior in large directed graphs." In KDD, pp. 941-950. ACM, 2014.

(56) References Cited

OTHER PUBLICATIONS

Nitin Jindal and Bing Liu. "Opinion spam and analysis." In WSDM, pp. 219-230. ACM, 2008.

Xiangnan Kong, Bokai Cao, and Philip S Yu. "Multi-label classification by mining label and instance correlations from heterogeneous information networks." In KDD, pp. 614-622. ACM, 2013.

Xiangnan Kong, Philip S Yu, Ying Ding, and David J Wild. "Meta path-based collective classification in heterogeneous information networks." In CIKM, pp. 1567-1571. ACM, 2012.

Chao Liu, Xifeng Yan, Hwanjo Yu, Jiawei Han, and S Yu Philip. "Mining behavior graphs for "backtrace" of noncrashing bugs." In SDM, pp. 286-297. SIAM, 2005.

Qing Lu and Lise Getoor. "Link-based classification." In ICML, vol. 3, pp. 496-503, 2003.

Emaad Manzoor, Sadegh M Milajerdi, and Leman Akoglu. "Fast memory-efficient anomaly detection in streaming heterogeneous graphs." In KDD. ACM, 2016.

Jennifer Neville and David Jensen. "Iterative classification in relational data." In AAAI Workshop on Learning Statistical Models from Relational Data, pp. 13-20, 2000.

Jennifer Neville and David Jensen. Collective classification with relational dependency networks. In KDD Workshop on Multi-Relational Data Mining, pp. 77-91. Citeseer, 2003.

Caleb C Noble and Diane J Cook. "Graph-based anomaly detection." In KDD, pp. 631-636. ACM, 2003.

Myle Ott, Yejin Choi, Claire Cardie, and Jeffrey T Hancock. "Finding deceptive opinion spam by any stretch of the imagination." In ACL, pp. 309-319. ACL, 2011.

Bryan Perozzi and Leman Akoglu. "Scalable anomaly ranking of attributed neighborhoods." In SDM. SIAM, 2016.

Bryan Perozzi, Leman Akoglu, Patricia Iglesias Sanchez, and Emmanuel Muller. "Focused clustering and outlier detection in large attributed graphs." In KDD, pp. 1346-1355. ACM, 2014.

Prithviraj Sen, Galileo Namata, Mustafa Bilgic, Lise Getoor, Brian Galligher, and Tina Eliassi-Rad. "Collective classification in network data." AI magazine, 29(3):93, 2008.

Neil Shah, Alex Beutel, Brian Gallagher, and Christos Faloutsos. "Spotting suspicious link behavior with fbox: An adversarial perspective." In ICDM, pp. 959-964. IEEE, 2014.

Yizhou Sun, Jiawei Han, Xifeng Yan, Philip S Yu, and Tianyi Wu. "PathSim: Meta path-based top-K similarity search in heterogeneous information networks." In VLDB, 2011.

Yizhou Sun, Yintao Yu, and Jiawei Han. "Ranking-based clustering of heterogeneous information networks with star network schema." In KDD, pp. 797-806. ACM, 2009.

Ward, Mark, "Warcraft Game Maker in Spying Row", BBC News, published Oct. 31, 2005, retrieved Aug. 14, 2015, 1 pg.

Baoning Wu, Vinay Goel, and Brian D Davison. "Propagating trust and distrust to demote web spam." MTW, 190, 2006.

SECURE ANTI-CHEAT SYSTEM

RELATED APPLICATIONS

This application is a continuation of U.S. application Ser. No. 16/575,165, filed on Sep. 18, 2019 and titled "SECURE ANTI-CHEAT SYSTEM," which is hereby incorporated herein by reference in its entirety, and which is a continuation of U.S. application Ser. No. 14/752,467, filed on Jun. 26, 2015 and titled "SECURE ANTI-CHEAT SYSTEM," which is hereby incorporated herein by reference in its entirety, and which claims priority to U.S. Provisional Application No. 62/139,210, filed on Mar. 27, 2015 and titled "SECURE ANTI-CHEAT SYSTEM," which is hereby incorporated herein by reference in its entirety.

BACKGROUND

Video games have increased in popularity significantly over the past thirty years. As video games have proliferated, so has the complexity of many video games. Today's video games have many more features and can sometimes be much more difficult than video games of the past. Many users, or players, enjoy the challenge of today's difficult video games. However, some users are easily frustrated. Some of these users may keep practicing until they get better at the video game or will just stop playing the video game if they find it too challenging. However, other users will instead find ways to cheat at the video game. Cheating may include creating or using software that may interact with the video game on behalf of the user. This software will often perform automated tasks on behalf of the user and thus, are sometimes referred to as robots or bots.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

One embodiment discloses a computer-implemented method. The method may be implemented by a user computing device configured with specific computer-executable instructions. The method can include initiating execution of an application. Further, the method may include executing a dynamic cheat detection module stored within a volatile memory of the user computing device. Using the dynamic cheat detection module, the method can include establishing a first communication channel with a backend anti-cheat system. Moreover, the method may include accessing a cheat signatures payload received from the backend anti-cheat system using the first communication channel. In addition, the method can include loading the cheat signatures payload into the volatile memory without storing the cheat signatures payload into a non-volatile memory of the user computing device. The method may further include performing an anti-cheat detection process with respect to the application using at least the dynamic cheat detection module and the cheat signatures payload.

Another embodiment discloses a system that includes an electronic data store configured to store an application. The electronic data store can include non-volatile memory. The system may further include a volatile memory configured to temporarily store data. This volatile memory may be separate from the electronic data store. In addition, the system can include a hardware processor in communication with the electronic data store and the volatile memory. The hardware processor may be configured to execute specific computer-executable instructions to at least initiate execution of the application and execute a cheat detection module stored within the volatile memory. The hardware processor may further access a cheat signatures payload received from a backend anti-cheat system using a first communication channel. In addition, the hardware processor may load the cheat signatures payload into the volatile memory without storing the cheat signatures payload into the electronic data store. Further, the hardware processor may perform an anti-cheat detection process with respect to the application using at least the cheat detection module and the cheat signatures payload.

Another embodiment discloses a non-transitory computer-readable storage medium storing computer executable instructions that, when executed by one or more computing devices, configure the one or more computing devices to perform operations including executing a first application and executing a cheat detection module within a volatile memory of a first computing device of the one or more computing devices. Further, the operations can include establishing a first communication channel with a second computing device separate from the one or more computing devices. Moreover, the operations may include accessing a cheat signatures payload received from the second computing device using the first communication channel. In addition, the operations can include loading the cheat signatures payload into the volatile memory without storing the cheat signatures payload into a non-volatile memory of the first computing device. Using at least the cheat detection module and the cheat signatures payload, the operations may further include detecting whether a second application is executing on the first computing device. The second application may enable a user to cheat with respect to the first application.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
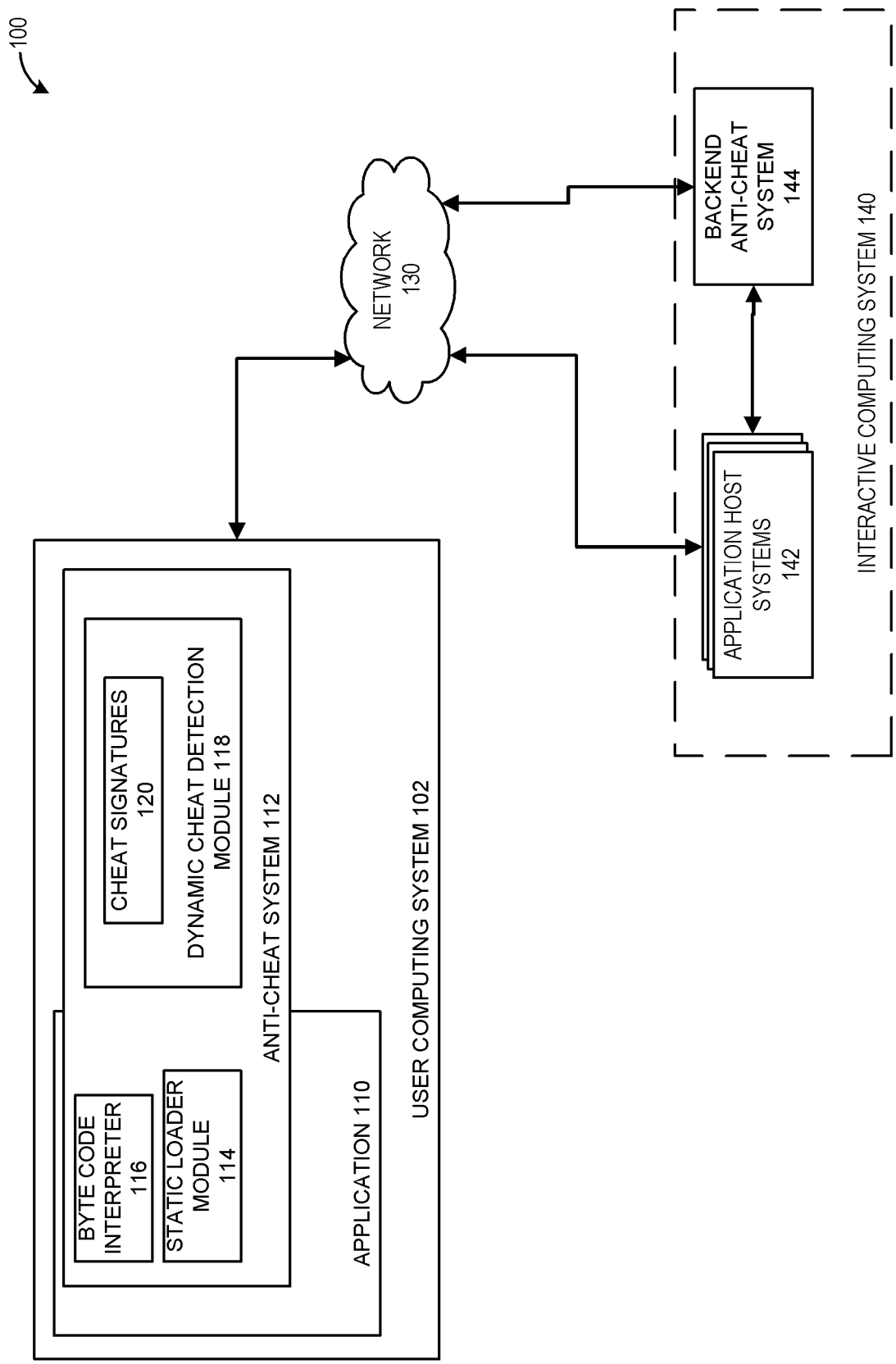
FIG. 1 illustrates an embodiment of a networked computing environment that can implement one or more embodiments of an anti-cheat system.

Some video games are single user or single player games. Thus, if a user decides to cheat or use some software that's extraneous to the game to modify the operation of the game as intended by the game's developer, the effect of the cheating will only impact the user and typically, not other users. However, with games that are multiplayer, cheating by one user may impact the enjoyment of playing the games for other users. For example, some players (sometimes referred to as users) utilize software, sometimes termed robots or bots, that can interact with the game on the player's behalf to help, for example, improve the abilities or statistics of the player's in-game character or avatar, or to obtain some in-game resource. Using a robot enables a user to, for example, obtain an increased amount of an in-game resource while the user is sleeping, eating, or working. Further, some users will then sell these "farmed" resources to other users, which can result in an unbalancing of the game. The cheating by some users can cause a loss of sales from disillusioned users. Thus, it is beneficial for a game developer or publisher to prevent or reduce the amount of cheating or other unauthorized interaction with the game.

One solution to the above problems is to use a system to monitor the player's computing system to detect the use of unauthorized software that interacts with the game. However, in some cases, a malicious user may access the system that monitors the players computing system and modify it to prevent the monitoring system from performing its intended function.

Various embodiments disclosed herein describe an anti-cheat system that is accessed over a network and stored directly into volatile memory of a user computing system. This anti-cheat system may then scan, or access portions of, the volatile memory of the user computing system to detect whether cheat software or other unauthorized software that may interact with the game is detected on the user computing system. The accessed portions of the volatile memory may be compared with one or more signatures that are associated with the execution of cheat software on a computing system.

Advantageously, in certain embodiments, by storing the anti-cheat system, or a portion thereof, directly into volatile memory, malicious users are prevented from accessing and/or modifying the anti-cheat system. Further, by obtaining the anti-cheat system over a network and storing it into volatile memory when the game is executed, the anti-cheat system can be automatically deleted from the volatile memory when the game is exited or ceases executing. Thus, in certain embodiments, the amount of non-volatile memory used by the game may be reduced, which can in some cases result in a particular non-volatile storage device having room to store more applications. Although the present disclosure is primarily described with respect to game applications, it should be understood that embodiments herein may be implemented with respect to other software applications and is not limited to game applications.

As one illustrative, non-limiting example, of certain embodiments described herein, a gamer Will has been playing a multi-player shooter game on his smartphone, but is not advancing as quickly as he had hoped. Thus, Will decided to load some game cheating software onto his smartphone to assist him with the game. The game cheating software may act as an automated bot and may automatically make selections that will advance or level-up Will's character in the game enabling Will to more easily advance in the game to the next level. However, Will does not know that the shooter game includes an anti-cheat system. Thus, when Will loads the game the next time and attempts to use the game cheating software, the anti-cheat software automatically detects that Will is using game cheating software and sends a signal to a game server that disables or reduces Will's access to the game.

As used herein, the term "developer" may include its plain meaning. Further, the term "developer" may not only refer to a user, group of users, or entity that developed and/or created an application, but may also include other users or entities involved in the maintenance or provisioning of an application. For example, the term "developer" as used herein may include a video game publisher or a video game host entity that provides access to a video game or other application on behalf of, for example, a developer or publisher.

Example Networked Computing Environment

FIG. 1 illustrates an embodiment of a networked computing environment 100 that can implement one or more embodiments of an anti-cheat system 112. The networked computing environment 100 can include one or more user computing systems 102 and one or more interactive computing systems 140. To simplify discussion and not to limit the present disclosure, FIG. 1 illustrates only one user computing system 102 and one interactive computing system 140. The user computing system 102 may communicate via a network 130 with the interactive computing system 140. Although only one network 130 is illustrated, multiple distinct and/or distributed networks 130 may exist.

The user computing system 102 may include hardware and software components for establishing communications over a communication network 130. For example, the user systems 102 may be equipped with networking equipment and network software applications (for example, a web browser) that facilitate communications via a network (for example, the Internet) or an intranet. The user computing system 102 may have varied local computing resources such as central processing units and architectures, memory, mass storage, graphics processing units, communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the user computing system 102 may include one or more of the embodiments described below with respect to FIG. 4 and FIG. 5.

Typically, the user computing system 102 is capable of executing an application 110, such as a video game, that may be stored and/or executed in a distributed environment. For example, the user computing system 102 may execute a portion of a game and the interactive computing system 140, or an application host system 142 of the interactive computing system 140, may execute another portion of the game. For instance, the game may be a massively multi-player online role-playing game (MMORPG) that includes a client portion executed by the user computing system 102 and a server portion executed by one or more application host systems 142. For the present discussion, the application 110 can include a distributed application or an application that includes a portion that executes on the user computing system 102 and a portion that executes on at least one of the application host systems 142.

As stated above, the user computing system 102 may execute one or more applications, such as the application 110. Typically, the application 110 is a videogame. However, the application 110 is not limited as such and can include any application where a user's actions with respect to the application may impact another user, such as, for example, an email application, a web browser, a testing application, and so forth. These impermissible actions may generally include cheating or other unauthorized actions. One example of cheating may include performing an action with respect to the application 110 that is not intended by a developer of the application. Another example of cheating may include using another application or script to perform permissible actions or actions intended by the developer more frequently than intended by the developer, without the use of user interaction to perform the action, or with the use of alternative user actions that differ from the developer intended user actions.

To prevent or reduce cheating, or to prevent or reduce a user from performing actions with respect to the application 110 that an entity owning or managing the interactive computing system 140 desires to prevent, the application 110 may include or utilize the anti-cheat system 112. In certain embodiments, the anti-cheat system 112 may be made up of one or more components. Some of the components of the anti-cheat system 112 may be included as part of the source code or compiled code of application 110 that a user may obtain when obtaining access to (for example, purchasing renting, licensing, and so forth) a copy of the application 110. Other components of the anti-cheat system 112 may be separate from the application 110 or may be obtained separately. For example, some components may be installed with the application 110 from a game media device or over a network, while other components may be obtained in response to executing the application 110. To illustrate the idea that the anti-cheat system 112 may include portions that may be part of the application 110 and portions that may be separate from the application 110, the box representing the anti-cheat system 112 is illustrated in FIG. 1 as being partially within the application 110 and partially external to the application 110.

The illustrated embodiment of the anti-cheat system 112 includes a static loader module 114, a byte code interpreter 116, and a dynamic cheat detection module 118. The static loader module 114 may include code that can be executed as part of the application 110 that is capable of initiating a communication channel with an application host system 142 and/or a backend anti-cheat system 144. Further, static loader module 114 is capable of obtaining executable code from one or more of the application host system 142, the backend anti-cheat system 144, or another system. In certain embodiments, the executable code obtained by the static loader module 114 is the dynamic cheat detection module 118. Further, in certain embodiments, the application host system 142 can implement one or more features of the backend anti-cheat system 144. Thus, in certain embodiments, the backend anti-cheat system 144 may be omitted or optional. Moreover, in some such cases, communication channels established between the static loader module 114, the dynamic cheat detection module 118, or the anti-cheat system 112 may be established with the application host system 142 instead of or in addition to the backend anti-cheat system 144.

The static loader module 114, in some implementations, may load the dynamic cheat detection module 118 into volatile memory, such as a Random Access Memory (RAM) (not shown) of the user computing system 102. In some embodiments, the static loader module 114 loads the dynamic cheat detection module 118 directly into the volatile memory without storing the dynamic cheat detection module 118 in nonvolatile memory. Advantageously, in certain embodiments, loading the dynamic cheat detection module 118 directly into volatile memory prevents malicious users from accessing the code of the dynamic cheat detection module 118, thereby preventing the malicious users from reverse engineering the dynamic cheat detection module 118 or otherwise tampering with the dynamic cheat detection module 118.

In some implementations, the static loader module 114 may be or may include a version of a dynamic library loader. In some cases, the dynamic library loader included with the static loader module 114 may serve as a replacement for a dynamic library loader included in an operating system executed by the user computing system 102, such as the dynamic-link library (DLL) loader included in some Microsoft® operating systems.

In some embodiments, the dynamic cheat detection module 118 may be received from the interactive computing system 140 as byte code. In such cases, the byte code interpreter 116 may be used to execute the dynamic cheat detection module 118. In some cases, such as when the dynamic cheat detection module 118 is executable code, the byte code interpreter 116 may be optional or omitted.

The dynamic cheat detection module 118 may include executable code that is capable of scanning volatile memory to detect the presence of code or software used to cheat or otherwise perform restricted actions with respect to the application 110. Further, the dynamic cheat detection module 118 is capable of creating a hash or other representation of a portion of the volatile memory and comparing the hash or other representation to a cheat signature, which may be included in the cheat signatures 120 to determine whether the user is using software to cheat. The cheat signatures 120 or a representation of the cheat signatures 120 may be downloaded or otherwise obtained by the dynamic cheat detection module 118 from the backend anti-cheat system 144, or another system. In some cases, the dynamic cheat detection module 118 may obtain the cheat signatures 120 (sometimes referred to as the cheat signatures payload) using a communication channel established by the static loader module 114. The communication channel may be a secure or encrypted communication channel thereby preventing a malicious user from accessing the cheat signatures payload during or after transmission between the interactive computing system 140 and the user computing system 102.

The interactive computing system 140 may include one or more computing systems configured to execute a portion of the application 110. Further, the interactive computing system 140 may enable multiple users or computing systems to access the portion of the application 110 executed or hosted by the interactive computing system 140. In some embodiments, the portion of the application 110 executed by a computing system of the interactive computing system 140 may create a persistent virtual world. This persistent virtual world may enable one or more users to interact with the virtual world and with each other in a synchronous and/or asynchronous manner. In some cases, multiple instances of the persistent virtual world may be created or hosted by the interactive computing system 140. A set of users may be assigned to or may access one instance of the persistent virtual world while another set of users may be assigned to or may access another instance of the persistent virtual world.

As illustrated in FIG. 1, the interactive computing system 140 may include one or more application host systems 142 and a backend anti-cheat system 144. The one or more application host systems 142 can include one or more computing devices, such as servers and databases that may host and/or execute a portion of one or more instances of the application 110. In certain embodiments, instead of or in addition to executing a portion of the application 110, the application host systems 142 execute another application, which may complement and/or interact with the application 110 during execution of an instance of the application 110.

Further, the backend anti-cheat system 144 can include systems that can provide to the anti-cheat system 112 an instance of the dynamic cheat detection module 118 and/or the cheat signatures payload 120. Further, the backend anti-cheat system 144 may be capable of reviewing and/or regulating a user's access to the application 110 based, at least in part, on the result of a cheat detection process performed by the dynamic cheat detection module 118. In some cases, the backend anti-cheat system 144 regulates the user's access to the application 110 by preventing an instance of the application 110 on the user computing system 102 from interacting with the application host systems 142 and/or an application executing or hosted by the application host systems 142. As previously described, the application executing or hosted by the application host system 142 may be a portion of the application 110 and/or a complementary application configured to interact with the application 110.

The network 130 can include any type of communication network. For example, the network 130 can include one or more of a wide area network (WAN), a local area network (LAN), a cellular network, an ad hoc network, a satellite network, a wired network, a wireless network, and so forth. Further, in some cases, the network 130 can include the Internet.

Example Anti-Cheat Initiation Process

Figure 2:
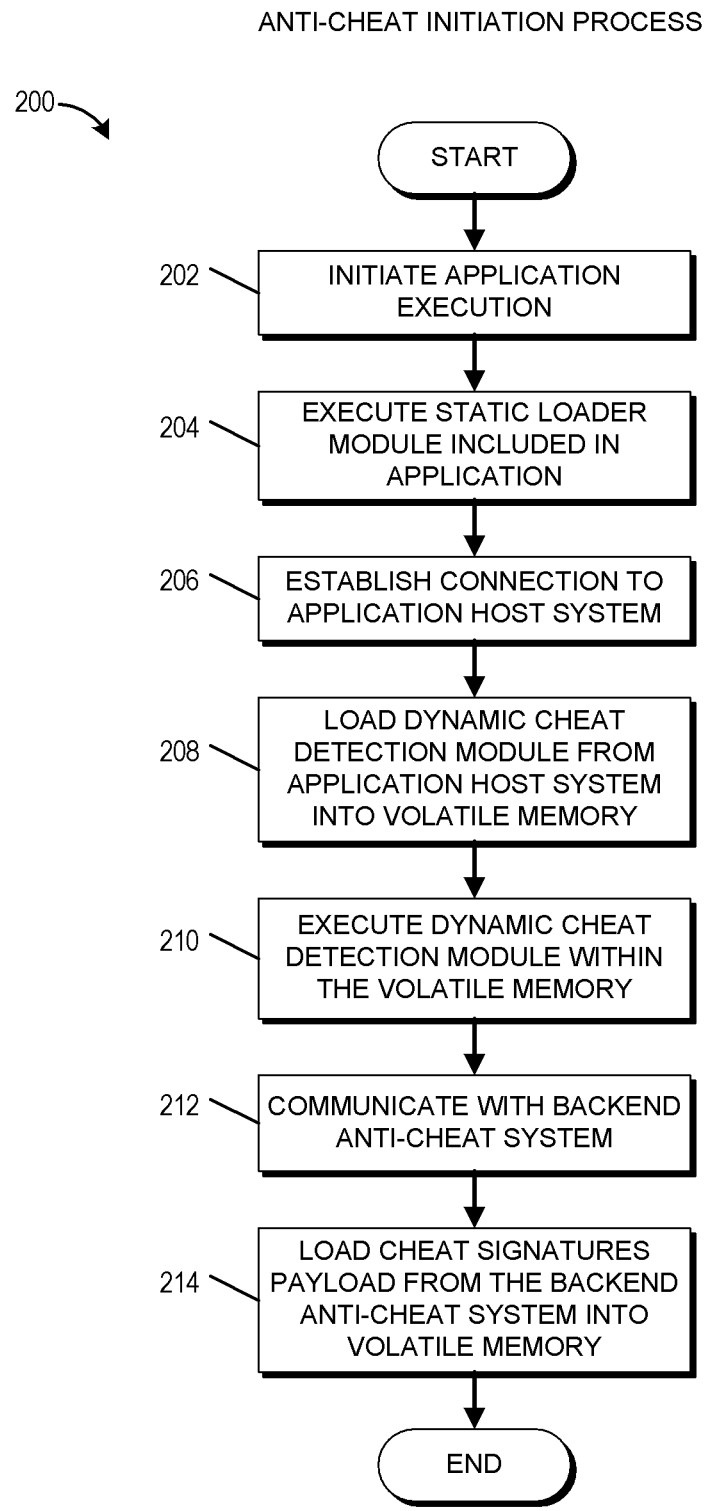
FIG. 2 presents a flowchart of an embodiment of an anti-cheat initiation process.

FIG. 2 presents a flowchart of an embodiment of an anti-cheat initiation process 200. The process 200 can be implemented by any system that can load and/or initiate a system for detecting cheating with respect to interaction, user or otherwise, with an application on a computing system. For example, the process 200, in whole or in part, can be implemented by an anti-cheat system 112, a static loader module 114, or a dynamic cheat detection module 118, among others. Although any number of systems, in whole or in part, can implement the process 200, to simplify discussion, the process 200 will be described with respect to particular systems.

The process 200 begins at block 202 where, for example, the user computing system 102 initiates execution of the application 110. The application 110 may be executed in response to an action by the user with respect to the user computing system 102. For example, the user may select an icon associated with the application 110 to instruct the user computing system 102 to execute or initiate execution of the application 110. In some cases, the application 110 may automatically execute. For example, the user computing system 102 may be configured to execute the application 110 after startup of the user computing system 102 or after insertion of a non-transitory computer readable media (for example, a CD, DVD, or USB memory device) into the user computing system 102.

At block 204, the user computing system 102 executes the static loader module 114 included in the application 110. The static loader module 114 may be executed as part of the execution of an anti-cheat system 112, or a part thereof. Executing the static loader module 114 may include executing program code or software included with the application 110 that corresponds to the static loader module 114. In some implementations, the block 204 may be performed as part of the initial application execution process performed at the block 202.

At block 206, the static loader module 114 establishes a network connection to an application host system 142. Alternatively, or in addition, the static loader module 114 may establish a network connection with the backend anti-cheat system 144. In some implementations, a separate network connection may be established between the application 110 and one of the application host systems 142. In some implementations, it can be advantageous for the backend anti-cheat system 144 to communicate indirectly with the anti-cheat system 112 via the application host systems 142. In such an implementation, the backend anti-cheat system 144 would not be exposed to the user computing system 102, and would help prevent potential cheaters and cheat-makers from analyzing and/or manipulating communication between the user computing system 102 and the backend anti-cheat system 144. Alternatively, the static loader module 114 and other components of the application 110 may share one or more network connections with the application host system 142. In some implementations, the connection between the static loader module 114 and the backend anti-cheat system 144 is a secure connection. This secure connection may use one or more types of encryption processes including, for example, symmetric encryption, asymmetric encryption, pretty good privacy (PGP) encryption, RSA encryption, Data Encryption Standard (DES) based encryption, and so forth.

The static loader module 114, at block 208, loads the dynamic cheat detection module 118 obtained from the application host system 142 into volatile memory, such as RAM, cache memory, or any other type of memory that does not maintain the storage of data when the user computing system 102 is turned off or otherwise loses power. Typically, the dynamic cheat detection module 118 is loaded into a portion of the volatile memory that cannot be accessed or otherwise addressed by a user or application other than the application 110 or the anti-cheat system 112 of the application 110. Advantageously, in certain embodiments, by loading the dynamic cheat detection module 118 directly into volatile memory, a copy of the dynamic cheat detection module 118 is not stored or accessible from a non-volatile memory on the user computing system 102, such as a hard disk drive or a solid state drive of the user computing system 102. Thus, a user is prevented from accessing a copy of the dynamic cheat detection module 118 and reverse engineering or otherwise interacting with the dynamic cheat detection module 118 in a manner the developer of the dynamic cheat detection module 118 does not desire.

Loading the dynamic cheat detection module 118 into volatile memory may include downloading an instance, or otherwise obtaining the instance from the application host system 142 via the network 130, of the dynamic cheat detection module 118 from the application host system 142. Thus, although FIG. 1 illustrates the dynamic cheat detection module 118 as part of the anti-cheat system 112 on the user computing system 102, in some cases, the dynamic cheat detection module 118 is not initially included as part of the anti-cheat system 112 that may initially be installed with the application 110. Instead, the dynamic cheat detection module 118 may be loaded from the interactive computing system 140. After it is downloaded, the dynamic cheat detection module 118 may be linked with or may become part of the anti-cheat detection system 112. Alternatively, or in addition, the dynamic cheat detection module 118 may complement or function in cooperation with the anti-cheat detection system 112.

At block 210, the static loader module 114 executes the dynamic cheat detection module 118 within the volatile memory. Although the dynamic cheat detection module 118 is typically only stored and executed within volatile memory, in certain embodiments, at least a portion of the dynamic cheat detection module 118 may be stored in a protected portion of non-volatile memory, such as virtual memory. This may occur, for example, when RAM for the user computing system 102 exceeds a utilization rate and the user computing system 102 uses a portion of the non-volatile memory as virtual memory to supplement the available RAM. In certain embodiments, the dynamic cheat detection module 118 is prevented from being stored in non-volatile memory regardless of whether the user computing system 102 utilizes virtual memory. Thus, in some cases, pages of data within the RAM that include a portion of the dynamic cheat detection module 118 are prevented from being copied to portions of the non-volatile memory being utilized as virtual memory. In certain embodiments, executing the dynamic cheat detection module 118 may include using the byte code interpreter 116 to interpret or execute code associated with the dynamic cheat detection module 118.

At block 212, the dynamic cheat detection module 118 communicates with the backend anti-cheat system 144 via the network connection to the application host systems 142. In some embodiments, the dynamic cheat detection module 118 establishes a separate network connection to the backend anti-cheat system 144. Alternatively, the dynamic cheat detection module 118 may utilize a connection established by the static loader module 114 with the backend anti-cheat system 144. In other words, in some cases, the dynamic cheat detection module 118 may communicate with the backend anti-cheat system 144 using a network connection established by the static loader module 114. In either case, the connection may be a secure connection and may use encryption to help secure the connection.

At block 214, the dynamic cheat detection module 118 loads the cheat signatures payload (for example, the cheat signatures 120) from the backend anti-cheat system 144 into volatile memory. In some embodiments, the cheat signature payload can be loaded as part of the dynamic cheat detection module 118. In some such embodiments, the cheat signature payload could be downloaded into volatile memory as part of the dynamic cheat detection module 118. In some embodiments, the cheat signatures payload is provided by the backend anti-cheat system 144 to the application host systems 142. In some such embodiments, the dynamic cheat detection module 118 may load the cheat signatures payload from the application host system 142. As previously described with respect to the dynamic cheat detection module 118, in some embodiments, the cheat signatures 120 may in some cases be stored at least temporarily in a portion of non-volatile memory, such as a portion of non-volatile memory that is allocated as virtual memory to complement the RAM. However, in other embodiments, the cheat signatures 120 are prevented from being stored, even temporarily, in the non-volatile memory. Thus, in some cases, pages of data within the RAM that include a portion of the cheat signatures 120 are prevented from being copied to portions of the non-volatile memory being utilized as virtual memory. Further, in some cases, the portion of the volatile memory that includes the cheat signatures 120 is protected from access by applications or processes not associated with the dynamic cheat detection module 118. Advantageously, in certain embodiments, by limiting access to the cheat signatures 120 and/or preventing processes or applications not associated with the dynamic cheat detection module 118 from accessing the cheat signatures 120, malicious users are prevented from modifying the cheat signatures 120.

In certain embodiments, one or more of the dynamic cheat detection module 118 and the cheat signatures payload 120 may be selected based on one or more selection rules. The selection rules may include determining a geographic location of the user computing system 102, demographics associated with a user using the user computing system 102, a selected service level, or any other information that can be used to determine a version of a dynamic cheat detection module 118 and/or a version of the cheat signatures payload 120 to provide to the user computing system 102. Advantageously, in certain embodiments, an entity can test different versions of the dynamic cheat detection module 118 and/or different versions of the cheat signatures payload 120 by providing different versions of the dynamic cheat detection module 118 and/or the cheat signatures payload 120 to different users. For example, users in one country may receive a particular cheat signatures payload 120, but users in another country may receive another cheat signatures payload 120. In some cases, the different dynamic cheat detection module 118 and/or cheat signatures 120 may be selected based on differences in the language packs utilized by the application 110 and/or an operating system on the user computing system 102. Further, in some cases, the different dynamic cheat detection module 118 and/or cheat signatures 120 may be selected based on information about the user, such as the user's age, location, past history of cheating, and so forth.

After the dynamic cheat detection module 118 and the cheat signatures payload 120 has been obtained, an anti-cheat detection process may be implemented by the dynamic cheat detection module 118. A number of processes for detecting cheats are possible within the context of the present disclosure. One such non-limiting example process is described below with respect to FIG. 3.

Example Cheat Detection Process

Figure 3:
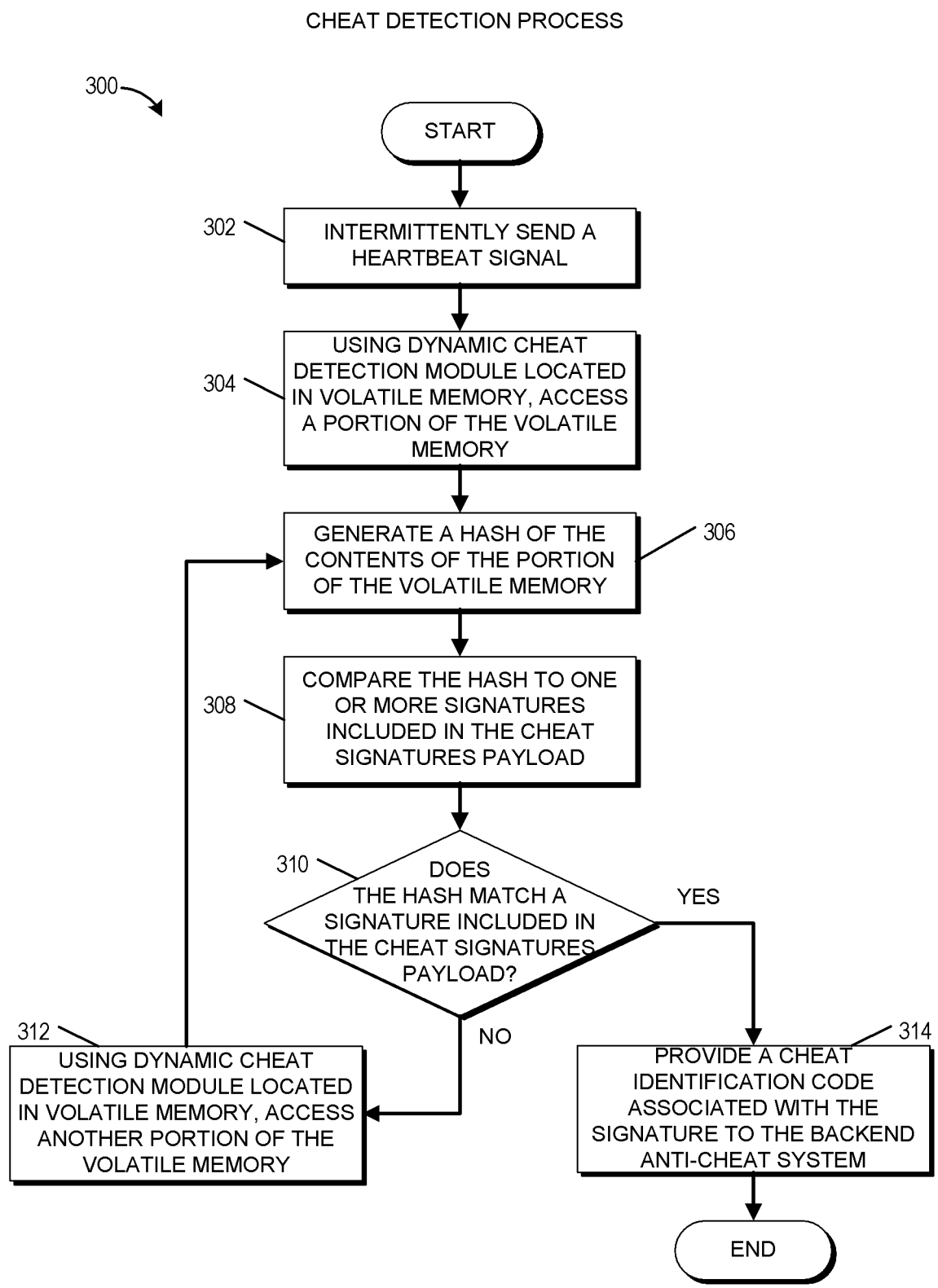
FIG. 3 presents a flowchart of an embodiment of a cheat detection process.

FIG. 3 presents a flowchart of an embodiment of a cheat detection process 300. The process 300 can be implemented by any system that can detect whether a user is attempting to cheat with respect to using an application (for example, playing a videogame) by, for example, using software that is not included as part of the application by the developer of the application. For example, the process 300, in whole or in part, can be implemented by an anti-cheat system 112, a static loader module 114, or a dynamic cheat detection module 118, among others. Although any number of systems, in whole or in part, can implement the process 300, to simplify discussion, the process 300 will be described with respect to particular systems.

Although the process 300 is primarily described with respect to a user attempting to cheat at a videogame, the process is not limited as such. In some embodiments, the process 300 may be used to detect user actions and/or automated actions (such as from or by a bot) that are beyond or outside the scope of interactions intended by the developer of the application 110. For instance, the process 300 may be used to detect an attempt to circumvent or cheat with respect to a test or exam application designed to test students.

As another example, the process 300 may be used to detect an attempt to cheat at a contest or to circumvent marketing. For instance, one contest or marketing scheme may involve voting for particular contestants or contest entries via a website or other computer-based voting mechanism. The contest organizers may desire to limit how frequently a particular user can vote. The process 300 may be used to reduce or prevent cheating by using an anti-cheat system 112 to identify cheat software that enables a user to circumvent voting limits. In some embodiments, the process 300, or a modified form thereof, may be used to detect cheating with respect to one or more types of processes or interactions that involve communication between computing systems, such as with respect to client/server interaction, without limit to the type of interaction or process. In other words, in certain embodiments, the process 300 may be used to detect unauthorized interactions by automated software between computing systems.

The process 300 begins at block 302 where, for example, the dynamic cheat detection module 118 intermittently sends a heartbeat signal to the backend anti-cheat system 144 via the application host system 142. For example, the heartbeat signal can be provided to the backend anti-cheat system 144 by the application host system 142. In some implementations, the dynamic cheat detection module 118 may send the signal directly to the backend anti-cheat system 144. Although intermittent, in some cases, the heartbeat signal is sent on a particular schedule. For example, the heartbeat signal may be sent every second, every minute, every five minutes, at a random time within an interval, and so forth. Alternatively, the heartbeat signal may be sent on a continuous basis or with each packet of data communicated between the application 110 and a portion of the application hosted by the application host system 142. This heartbeat signal may include any type of signal or message that informs the backend anti-cheat system 144 that the dynamic cheat detection module 118 is operating. Advantageously, in certain embodiments, the backend anti-cheat system 144 can use the heartbeat signal to confirm that a malicious user has not performed an action to cause the dynamic cheat detection module 118 to stop operating. In certain embodiments, the block 302 may be optional or omitted.

At block 304, the dynamic cheat detection module 118 accesses a portion of the volatile memory, such as RAM. As previously described, the dynamic cheat detection module 118 is typically stored in the volatile memory. Further, when the dynamic cheat detection module 118 is executing, it may be associated with a particular portion of the volatile memory that is allocated for use by the dynamic cheat detection module 118. In such cases, the dynamic cheat detection module 118 is not limited to accessing a portion of the volatile memory allocated for its use, but may access other portions of the volatile memory in an attempt to determine whether code associated with cheating is being utilized or executed by the user computing system 102.

At block 306, the dynamic cheat detection module 118 generates a hash value of the contents of the portion of the volatile memory accessed at the block 304. Alternatively, or in addition, the block 306 may include generating an alternative abstraction or other piece of data that corresponds to the portion of the volatile memory accessed at the block 304.

The dynamic cheat detection module 118, at block 308, compares the hash value to one or more signatures included in the cheat signatures payload 120. In some embodiments, the hash may serve as an index value for accessing a particular location within a data structure or database that includes the cheat signatures 120. Using the hash to access the data structure may result in obtaining a value or other data associated with the hash value, which may then be used to help determine whether a user is cheating. In some such cases, the lack of a value in the data structure associated with the hash may be used to help determine whether a user is cheating.

At decision block 310, the dynamic cheat detection module 118 determines whether the hash matches a signature included in the cheat signatures payload 120 based at least in part on the comparison performed at the block 308. In some cases, the decision block 310 may include determining whether the hash is a valid index to the cheat signatures payload 120. In other words, the decision block 310 may include determining whether the hash can be used as a key to access a value from a data structure corresponding to the cheat signatures payload 120. In some such cases, if the hash cannot be used to access a value, the decision block 310 determines that there is no match to a signature included in the cheat signatures payload 120. In contrast, if the hash can be used to access a value in the cheat signatures payload 120, then the decision block 310 determines that there is a match to a signature in the cheat signatures payload 120. In some cases, the hash may be referred to as a hash key. In certain embodiments, the cheat signatures payload 120 does not store signatures, but instead may have in identifier, such as an identification code, associated with different cheat signatures. This identification code may serve as the value in the cheat signatures payload 120 that may be accessed using the hash as the key.

If it is determined at the decision block 310 that the hash value does not match a signature included in the cheat signatures payload 120, the dynamic cheat detection module 118 accesses a another portion of the volatile memory at block 312. This additional portion of the volatile memory may be a subsequent portion of the volatile memory to the portion accessed at the block 304. However, the block 312 is not limited as such and the additional portion of volatile memory may be accessed from any portion of the volatile memory and/or based on a selection algorithm. Subsequent to block 312, the process 300 may return to block 306 where a hash of the volatile memory accessed at block 312 is created. In certain embodiments the process 300 may repeat until a cheat is detected or the application 110 ceases executing either in response to a user action or otherwise.

If it is determined at decision block 310 that the hash does match a signature included in the cheat signatures payload 120, the dynamic cheat detection module 118 provides a cheat identification code associated with the signature to the backend anti-cheat system 144 at block 314. As described above, the cheat identification code may be obtained by accessing a value from a cheat signatures payload 120 using the hash as an index or key to a data structure of the cheat signatures payload 120. In some cases, the value may be associated with the cheat identification code or may itself be the cheat identification code. Further, in some cases, the cheat identification code is a distinct code associated with a type of cheat. Alternatively, or in addition, the cheat identification code may include the hash value and/or signature associated with the identified cheat.

In certain embodiments, the backend anti-cheat system 144 may take one or more actions or perform one or more operations based on the cheat identification code received in response to performance of block 314. For example, the backend anti-cheat system 144 may request that the application host system 142 prevent the user computing system 102 and/or a user associated with the user computing system 102 from continuing to access the application host system 142. In some cases, this may effectively prevent the user from using or playing the application 110. As another example, the backend anti-cheat system 144 may identify or include the user in a list of potential cheaters and may provide a warning to the user. In some cases, the backend anti-cheat system 144 may take no action in response to receiving the identification of a cheat identification code. For example, in some cases, an entity associated with the interactive computing system 140 may be testing a new signature to determine if it is narrow enough to distinguish a particular cheat software from a signature associated with legitimate software or software that is not used for cheating, such as a word processor. In some such cases, the backend anti-cheat system 144 may monitor the number of users identified as potentially cheating based on the new signature.

An administrator may then use the collected information to determine whether the new signature is likely narrow enough to identify cheaters without identifying non-cheaters or while only identifying less than a threshold number of non-cheaters.

In some cases, after block 314 completes executing, the process 300 may end. In other cases, at least a portion of the process 300 may continue executing. For example, in cases where the cheat identification code is not associated with an action that triggers preventing the user from continuing to play the application 110, the process 300 may proceed to the block 312. For instance, the cheat identification may be associated with a warning or may be collected for tracking purposes. Further, in some embodiments, a multi-strike policy may be enacted by a developer of the application 110. Thus, in some such cases, a particular cheat identification code may trigger a warning the first time the cheat is detected, but may prevent a user from continuing to execute or play the application 110 a second time the cheat is detected. The multi-strike policy may be based on a particular cheat or on a set of cheats. Thus, the first strike may occur when a first cheat identification code is identified and the second strike may occur when a second cheat identification code that differs from the first cheat identification code is detected. In some embodiments, the cheat identification code may undergo further processing using heuristic detection algorithms to determine whether the user is cheating. For example, the cheat identification code may indicate that there is a possibility that a user may be cheating. The heuristic detection algorithms can be used to further analyze the cheat identification code in conjunction with other cheat identification codes, other information associated with the user computing device 102, and/or other computing devices to determine whether the user is cheating.

Generally, upon completion of the process 300, such as when a user exits the application 110, anything stored within the volatile memory related to the application 110 may be deleted, flushed from the volatile memory and/or non-volatile virtual memory, and/or overwritten by other applications. In some user computing systems, the volatile memory related to the application 110 may not be flushed or emptied when the application 110 exists. For example, a user computing system may be configured to allocate the volatile memory used by the application 110 for use by other applications enabling the contents of the volatile memory associated with the application 110 to eventually be overwritten, but may not immediately empty the memory upon the application 110 ceasing to execute. In some such cases, the anti-cheat system 112 may cause the volatile memory to be flushed or emptied as part of the shutdown process of the application 110, thereby preventing a user from accessing memory associated with the anti-cheat system 112 or individual components thereof, upon the application 110 ceasing to execute. In some such cases, at least the portion of the volatile memory that stores the cheat signatures 120, the dynamic cheat detection module 118, and/or the anti-cheat system 112 is emptied, overwritten, or flushed before the portion of the volatile memory is returned to an available memory pool. The available memory pool may include available memory from which the operating system, or other memory arbitrator, of the user computing system 102 allocates or assigns memory, such as RAM, for use by one or more applications. In some implementations, volatile memory assigned for use by a particular application cannot be accessed by other applications until the volatile memory is relinquished or returned to the available memory pool.

In some embodiments, a copy of a portion of the volatile memory is saved or provided to the interactive computing system 140. This saved portion of the volatile memory may be stored as proof or evidence of cheating by a user. Alternatively, or in addition, the saved portion of the volatile memory may be saved for further analysis by, for example, the backend anti-cheat system 144 to confirm whether cheating occurred and/or to detect the type of software used to cheat and/or the type of cheating that occurred.

Advantageously, in certain embodiments, as the dynamic cheat detection module 118 may only exist in volatile memory, the dynamic cheat detection module 118 is removed from the user computing system 102 upon exit of the application 110. Thus, a malicious user may be prevented from accessing or modifying the dynamic cheat detection module 118 as it is not stored, or permanently stored, within the non-volatile memory of the user computing system 102. Further, in some embodiments, the cheat signatures payload 120 is removed from the volatile memory of user computing system 102 when the application 110 ceases to execute. Moreover, as the cheat signatures payload 120 is only loaded into the volatile memory, in some embodiments, the cheat signatures payload 120 is deleted from the user computing system 102 upon the application 110 ceasing to execute.

Overview of Game System

Figure 4:
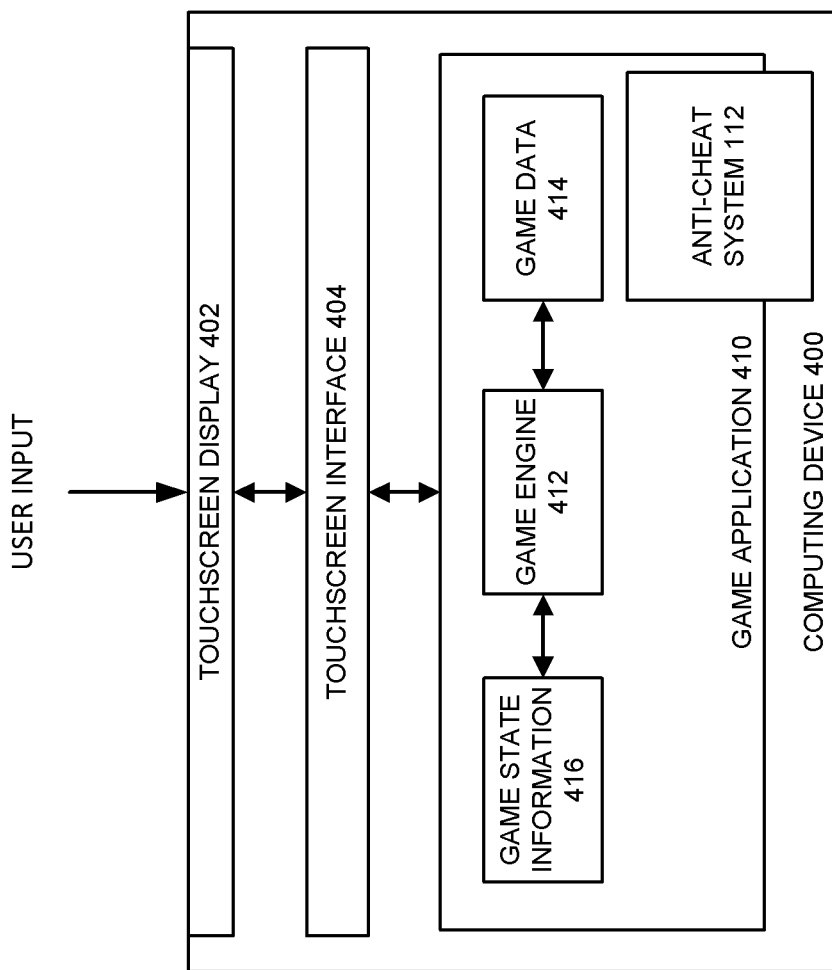
FIG. 4 illustrates an embodiment of a game system.

FIG. 4 illustrates an embodiment of a computing device 100, also referred to as a gaming system. The computing device 400 can be an embodiment of the user computing system 102 described above. In the example of FIG. 4, the computing device 400 is a touch-capable computing device capable of receiving input from a user via a touchscreen display 402. However, the computing device 400 is not limited as such and may include non-touch capable embodiments, which do not include a touchscreen display 402.

The computing device 400 includes a touchscreen display 402 and a touchscreen interface 404, and is configured to execute a game application 410. In certain embodiments, the game application 410 may be the application 110 and may include some or all of the embodiments described with respect to the application 110 including, for example, the anti-cheat system 112. Although described as a game application 410, in some embodiments the application 410 may be another type of application, such as exam software, a gambling application, or a financial application.

The computing device 400 can include one or more processors, such as central processing units (CPUs), graphics processing units (GPUs), and accelerated processing units (APUs). Further, the computing device 400 may include one or more data storage elements. In some embodiments, the computing device 400 can be a specialized computing device created for the purpose of executing game applications 410. For example, the computing device 400 may be a video game console. The game applications 410 executed by the computing device 400 may be created using a particular application programming interface (API) or compiled into a particular instruction set that may be specific to the computing device 400. In some embodiments, the computing device 400 may be a general purpose computing device capable of executing game applications 410 and non-game applications. For example, the computing device 400 may be a laptop with an integrated touchscreen display or desktop computer with an external touchscreen display. Components of an example embodiment of a computing device 400 are described in more detail with respect to FIG. 5.

The touchscreen display 402 can be capacitive touchscreen, a resistive touchscreen, surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 402. The touchscreen interface 404 can be configured to translate the touch input into data and output the data such that it can be interpreted by components of the computing device 400, such as an operating system and the application 410. The touchscreen interface 404 can translate characteristics of the tactile touch input touch into touch input data. Some example characteristics of a touch input can include, shape, size, pressure, location, direction, momentum, duration, and/or other characteristics. The touchscreen interface 404 can be configured to determine the type of touch input, such as, for example a tap (for example, touch and release at a single location) or a swipe (for example, movement through a plurality of locations on touchscreen in a single touch input). The touchscreen interface 404 can be configured to detect and output touch input data associated with multiple touch inputs simultaneously, or substantially in parallel. In some cases, the simultaneous touch inputs may include instances where a user maintains a first touch on the touchscreen display 402 while subsequently performing a second touch on the touchscreen display 402. The touchscreen interface 404 can be configured to detect movement of the touch inputs. The touch input data can be transmitted to components of the computing device 400 for processing. For example, the touch input data can be transmitted directly to the application 410 for processing.

In some embodiments, the touch input data can undergo processing and/or filtering by the touchscreen interface 404, an operating system, or other components prior to being output to the game application 410. As one example, raw touch input data can be captured from a touch input. The raw data can be filtered to remove background noise, pressure values associated with the input can be measured, and location coordinates associated with the touch input can be calculated. The type of touch input data provided to the game application 410 can be dependent upon the specific implementation of the touchscreen interface 404 and the particular API associated with the touchscreen interface 404. In some embodiments, the touch input data can include location coordinates of the touch input. The touch signal data can be output at a defined frequency. Processing the touch inputs can be computed many times per second and the touch input data can be output to the game application for further processing.

A game application 410 can be configured to be executed on the computing device 400. The game application 410 may also be referred to as a videogame, a game, game code and/or a game program. A game application should be understood to include software code that a computing device 400 can use to provide a game for a user to play. A game application 410 might comprise software code that informs a computing device 400 of processor instructions to execute, but might also include data used in the playing of the game, such as data relating to constants, images and other data structures. For example, in the illustrated embodiment, the game application includes a game engine 412, game data 414, and game state information 416.

Further, the game application 410 can include an embodiments of the anti-cheat system 112 described above. As described with respect to FIG. 1, the anti-cheat system 112 may include components that are part of the game application 410, or are included with the game application 410, as well as additional components that are obtained during execution of the game application 410 from another computing system. Thus, to illustrate the point that, in some embodiments, the anti-cheat system 112 may include components integrated with the game application 410 as well as additional separate components the game application 410 is illustrated as extending outside of the box representing the game application 410.

The touchscreen interface 404 or another component of the computing device 100, such as the operating system, can provide user input, such as touch inputs, to the game application. In some embodiments, the computing device 400 may include alternative or additional user input devices, such as a mouse, a keyboard, a camera, a game controller, and the like. A user can interact with the game application 410 via the touchscreen interface 404 and/or one or more of the alternative or additional user input devices. The game engine 412 can be configured to execute aspects of the operation of the game application 410 within the computing device 400. Execution of aspects of gameplay within a game application can be based, at least in part, on the user input received, the game data 414, and a game state information 416. The game data 414 can include game rules, prerecorded motion capture poses/paths, environmental settings, constraints, skeleton models, and/or other game application information. The game engine 412 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 410, the game application 410 can store game state information 416, which can include character states, environment states, scene object storage, and/or other information associated with a state of execution of the game application 410. For example, the game state information 116 can identify the state of the game application at a specific point in time, such as a character position, character action, game level attributes, and other information contributing to a state of the game application.

The game engine 412 can receive the user inputs and determine in-game events, such as actions, collisions, runs, throws, attacks and other events appropriate for the game application 410. During operation, the game engine 412 can read in game data 414 and a game state information 416 in order to determine the appropriate in-game events. In one example, after the game engine 412 determines the character events, the character events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Overview of Computing Device

Figure 5:
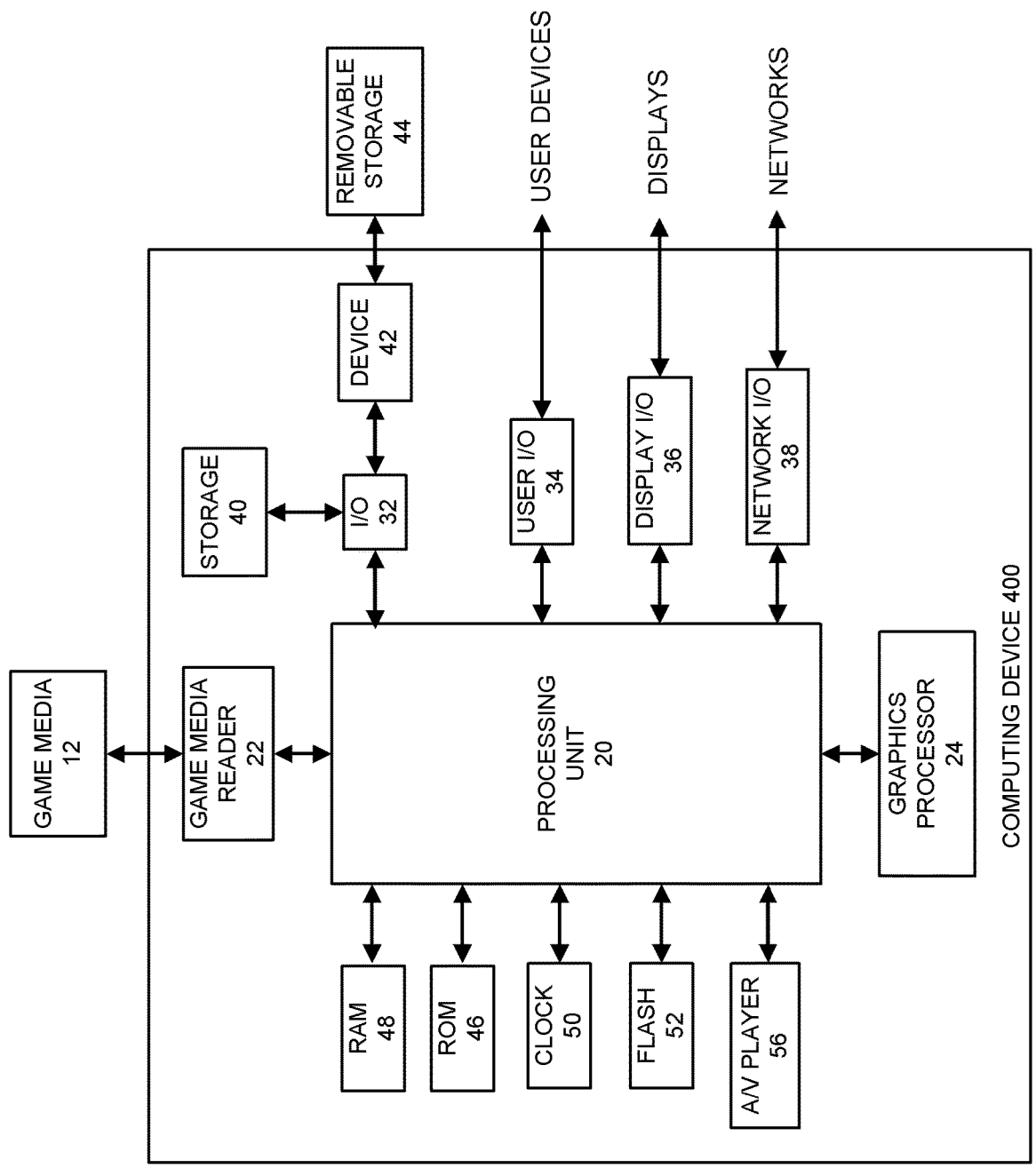
FIG. 5 illustrates an embodiment of a computing device.

FIG. 5 illustrates additional details of an embodiment of the computing device 400 of FIG. 4 according to the present disclosure. Other variations of the computing device 400 may be substituted for the examples explicitly presented herein, such as removing or adding components to the computing device 400. The computing device 400 may include a game device, a smart phone, a tablet, a personal computer, a laptop, a smart television, a car console display, and the like. Further, (although not explicitly illustrated in FIG. 5) as described with respect to FIG. 4, the computing device 400 may optionally include a touchscreen display 402 and a touchscreen interface 404.

As shown, the computing device 400 includes a processing unit 20 that interacts with other components of the computing device 400 and also external components to the computing device 100. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The computing device 400 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing device 400 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device. Computing device 400 might be a handheld video game device, a dedicated game console computing system, a general-purpose laptop or desktop computer, a smart phone, a tablet, a car console, or other system capable of executing one or more game applications or other types of applications.

The computing device 400 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 100. Processing unit 20 can communicate through I/O 32 to store data, such as game state data and any shared data files. In addition to storage 40 and removable storage media 44, computing device 100 is also shown including ROM (Read-Only Memory) 46 and RAM 48. RAM 48 may be used for data that is accessed frequently, such as when a game is being played. Further, the RAM 48 may be used to store at least some of the anti-cheat system 112. As previously described, access restrictions may be placed on the portions of the RAM 48 that store the at least some of the anti-cheat system 112.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online. Further, the network I/O 38 may be used to access at least a portion of the anti-cheat system 112 from another computing system, such as a backend anti-cheat system 144 and/or an application host system 142. In some embodiments, at least some content or data packets received by the network I/O 38 are prevented from being stored in the storage 40, or in non-volatile memory. By preventing certain data packets associated with the anti-cheat system 112 from being provided to non-volatile memory, a user is prevented from accessing, modifying, or interfering with the operation of the anti-cheat system 112.

Display output signals may be produced by the display I/O 36 and can include signals for displaying visual content produced by the computing device 400 on a display device, such as graphics, user interfaces, video, and/or other visual content. Computing device 400 may comprise one or more integrated displays configured to receive display output signals produced by the display I/O 36, which may be output for display to a user. According to some embodiments, display output signals produced by the display I/O 36 may also be output to one or more display devices external to the computing device 400.

The computing device 400 can also include other features that may be used with a game, such as a clock 50, flash memory 52, and other components. An audio/video player 56 might also be used to play a video sequence, such as a movie. It should be understood that other components may be provided in computing device 400 and that a person skilled in the art will appreciate other variations of computing device 400.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing device 100 is turned off or loses power.

As computing device 400 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system comprising one or more hardware processors configured to execute specific computer-executable instructions,
receiving an indication generated by a static loader of a first portion of a first application executing on a first computing system that the first application is executing, wherein the first portion of the first application is configured to communicate with a second portion of the first application executing at a host computing system separate from the first computing system;
transmitting executable code of a dynamic cheat detection module to the first computing system in response to the indication generated by the static loader;
receiving a request to obtain a set of cheat signatures from the dynamic cheat detection module executing at the first computing system;

transmitting the set of cheat signatures to the first computing system, wherein the set of cheat signatures are usable by the dynamic cheat detection module to determine whether portions of volatile memory of the first computing system indicate that a second application that is independent of the first application is executing on the first computing system, wherein the second application enables cheating in the first application;

receiving an indication from the dynamic cheat detection module that the second application is executing on the first computing system; and responsive, at least in part, to receiving the indication that the second application is executing on the first computing system, performing a remediation action associated with the first application.

2. The computer-implemented method of claim 1, wherein performing the remediation action comprises preventing the first computing system from accessing the host computing system.

3. The computer-implemented method of claim 1, wherein performing the remediation action comprises adding an identifier of a user executing the first application to a set of identifiers of cheaters.

4. The computer-implemented method of claim 1, wherein performing the remediation action comprises alerting a user executing the first application that the user has been identified as a cheater.

5. The computer-implemented method of claim 1, wherein, responsive, at least in part, to receiving the indication that the second application is executing on the first computing system, the method further comprises:

incrementing a cheat count indicating a number of times a user executing the first application has been detected cheating; and determining that the cheat count satisfies a cheat maximum threshold, wherein the performing the remediation action occurs responsive, at least in part, to the cheat count satisfying the cheat maximum threshold.

6. The computer-implemented method of claim 1, further comprising receiving a copy of a portion of the volatile memory from the portions of volatile memory of the first computing system that indicate that the second application is executing.

7. The computer-implemented method of claim 6, further comprising analyzing the portion of the volatile memory to confirm whether a user executing the first application cheated when executing the first application on the first computer.

8. The computer-implemented method of claim 1, further comprising:

receiving a heartbeat signal from the dynamic cheat detection module executing at the first computing system; and determining that the dynamic cheat detection module is operating at the first computing system based at least in part on the heartbeat signal.

9. The computer-implemented method of claim 8, wherein the heartbeat signal is received periodically or with each data packet received from the first computing system.

10. The computer-implemented method of claim 1, wherein, in response to receiving a second request to obtain the set of cheat signatures, the method further comprising transmitting a second set of cheat signatures comprising different cheat signatures than the first set of cheat signatures.

11. The computer-implemented method of claim 1, further comprising:

receiving metadata associated with one or more of the first portion of the first application or the first computing system; and selecting the set of cheat signatures from a plurality of sets of cheat signatures based at least in part on the metadata.

12. The computer-implemented method of claim 11, wherein the metadata comprises a geographic location of the first computing system, an operating system executing on the first computing system, or a language pack in use by the first portion of the first application.

13. An interactive computing system comprising:

an electronic data store configured to store one or more sets of cheat signatures; and a hardware processor in communication with the electronic data store and configured to execute specific computer-executable instructions to at least:

receive an indication generated by a static loader of a first portion of a first application executing on a first computing system that the first application is executing, wherein the first portion of the first application is configured to communicate with a second portion of the first application executing at a host computing system separate from the first computing system;

transmit executable code of a dynamic cheat detection module to the first computing system in response to the indication generated by the static loader;

receive a request to obtain a set of cheat signatures from the dynamic cheat detection module executing at the first computing system;

transmit the set of cheat signatures to the first computing system, wherein the set of cheat signatures are usable by the dynamic cheat detection module to determine whether portions of volatile memory of the first computing system indicate that a second application that is independent of the first application is executing on the first computing system, wherein the second application enables cheating in the first application;

receive an indication from the dynamic cheat detection module that the second application is executing on the first computing system; and responsive, at least in part, to receiving the indication that the second application is executing on the first computing system, trigger a remediation action.

14. The interactive computing system of claim 13, wherein the hardware processor is further configured to perform the remediation action by preventing the first computing system from accessing the host computing system.

15. The interactive computing system of claim 13, wherein the hardware processor is further configured to perform the remediation action by adding an identifier of a user executing the first application to a set of identifiers of cheaters.

16. The interactive computing system of claim 13, wherein the hardware processor is further configured to perform the remediation action by alerting a user executing the first application that the user has been identified as a cheater.

17. The interactive computing system of claim 13, wherein, responsive, at least in part, to receiving the indication that the second application is executing on the first computing system, the hardware processor is further configured to execute specific computer-executable instructions to at least:

increment a cheat count indicating a number of times a user executing the first application has been detected cheating; and determine that the cheat count satisfies a cheat maximum threshold, wherein the hardware processor triggers the remediation action responsive, at least in part, to the cheat count satisfying the cheat maximum threshold.

18. The interactive computing system of claim 13, wherein the hardware processor is further configured to execute specific computer-executable instructions to at least:

receive a copy of a portion of the volatile memory from the portions of volatile memory of the first computing system that indicate that the second application is executing; and analyze the portion of the volatile memory to confirm whether a user executing the first application cheated when executing the first application on the first computer.

19. The interactive computing system of claim 13, wherein the hardware processor is further configured to execute specific computer-executable instructions to at least:

receive a heartbeat signal from the dynamic cheat detection module executing at the first computing system; and determine that the dynamic cheat detection module is operating at the first computing system based at least in part on the heartbeat signal.

20. A non-transitory computer-readable storage medium storing computer executable instructions that, when executed by one or more computing devices, configure the one or more computing devices to perform operations comprising:

receiving an indication generated by a static loader of a first portion of a first application executing on a first computing system that the first application is executing, wherein the first portion of the first application is configured to communicate with a second portion of the first application executing at a host computing system separate from the first computing system;

transmitting executable code of a dynamic cheat detection module to the first computing system in response to the indication generated by the static loader;

receiving a request to obtain a set of cheat signatures from the dynamic cheat detection module executing at the first computing system;

transmitting the set of cheat signatures to the first computing system, wherein the set of cheat signatures are usable by the dynamic cheat detection module to determine whether portions of volatile memory of the first computing system indicate that a second application that is independent of the first application is executing on the first computing system, wherein the second application enables cheating in the first application;

receiving an indication from the dynamic cheat detection module that the second application is executing on the first computing system; and responsive, at least in part, to receiving the indication that the second application is executing on the first computing system, performing a remediation action associated with the first application.

* * * * *